March 15, 1949.  C. W. GRAHAM  2,464,500

TRIPOD HEAD

Filed April 29, 1947

INVENTOR.
Charles W. Graham

Patented Mar. 15, 1949

2,464,500

UNITED STATES PATENT OFFICE 2,464,500

TRIPOD HEAD

Charles W. Graham, Washington, D. C.

Application April 29, 1947, Serial No. 744,739

6 Claims. (Cl. 248—183)

This invention relates to a universally movable tripod head for use with both still and movie cameras.

A principal object is to provide an adjustable tripod head that will permit perfect leveling of a camera mounted thereon when the tripod is set on uneven or hilly ground.

A further object is to provide a tripod head that has a universally adjustable ball member carrying a panning element that may be adjusted for a fairly snug pan movement and with means for clamping said pan element to said ball member when the panning movement is not needed, for example, when using a still camera, other than for adjusting position of the camera in a horizontal plane to include the desired scene.

A still further object is to provide a tripod head of neat and attractive appearance and of simple easily machined parts to permit selling at a very reasonable price.

Further objects and advantages will appear as the description proceeds.

Referring now to the drawings.

Figure 1:
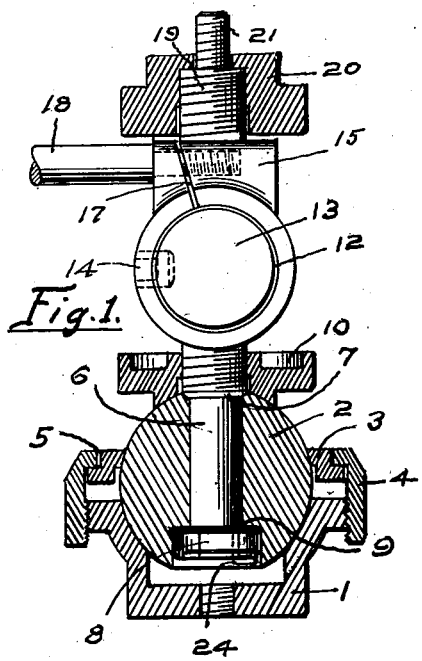
Figure 1 is a vertical section of a tripod head embodying the features of invention mentioned.
Figure 2:
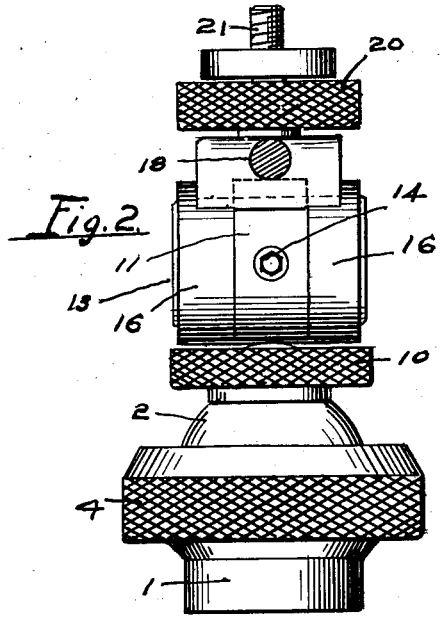
Figure 2 is a side elevation of the head of Figure 1.
Figures 3, 4:
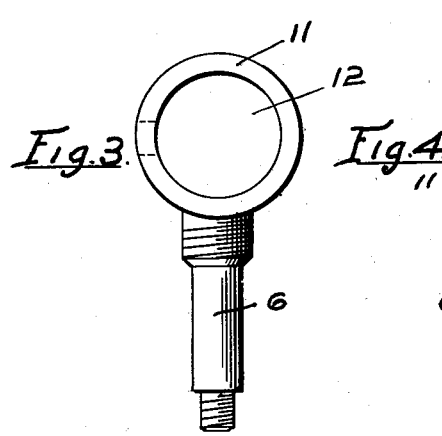
Figure 3 is a detail of the pan spindle.
Figure 4 is a side view of Figure 3.

The amateur photographer desires a simple tripod head which will enable him to mount his small still camera or small movie camera quickly and accurately for the view to be photographed and which can be changed to any other desired position relative to a movement of the tripod to another position, as quickly as possible, and it is believed that the disclosure herein provides such facility.

There is a base member 1 that is secured to the tripod top by the usual tripod screw which holds the base member securely. In the present base member 1 provides a seat for a ball member 2, and means for securely clamping the ball member 2 into the base member 1 in the clamp ring 3 forced against the ball member 2 by means of the clamp ring 4, which screwed onto the threaded end of the base member 1 will clamp the ring 3 tightly onto the ball member 2 and hold it against movement relative to the base member 1. As shown here it is simply a knurled ring to be hand operated, but if it is found necessary to be able to apply more clamping pressure than can be applied by the hand, holes can be provided in the rim of the screw member 4 for the insertion of a small rod to give added leverage to the clamping action. These small rods are old and well known in the art so it has been thought not necessary to show them in the drawings. It is to be noted that it is desirable that the ring 3 be slightly movable laterally so that it can seat centrally on the ball member 2 and thereby effect a more secure clamping action. A slight clearance is shown at 5.

Mounted centrally of the ball member 2 is the panning stem 6, which fits a small tapered end 7 in the ball member 2 and is held tightly therein by means of the nut 8 and the fibre or leather washer 9 on the lower end of the stem 6. Adjustment is made here to give the desired resistance to turning for the pan movement, the nut 8 being tightened sufficiently to give rather a stiff movement or such as may be desired by the operator, in other words the pan movement can be somewhat stiffer than the tilt movement above so that free tilting can be accomplished without panning and therefore without any other clamping means on the pan mechanism.

If however it is desired to actually clamp the pan movement against action the clamping screw 10 is provided on the stem 6 to clamp down onto the top of the ball member 2 to positively prevent any pan movement when the tilt part of the head is manipulated.

The pan stem 6 carries on its upper end the center portion of the tilt mechanism 11, with a central bore 12 which supports the tilt pin bearing 13 which is secured against movement relative to the member 11 by a hollow set screw 14, or by any other suitable means.

The tilting head 15 includes two depending ring members 16 having clamping bearing on the tilt bearing member 13 by means of the split 17 and the hand actuating screw rod 18. The tilting member 15 is provided at its upper end with a screw member 19 on which is mounted a nut member 20, and another screw member 21, adapted to screw into the base of the camera in use to secure the camera to the tripod head.

The depth of the screw holes in different cameras vary considerable so that some means should be provided to compensate for this condition. The nut 20 is provided for this purpose. The camera is mounted on the end of the screw member 21 sufficient to hold it when clamped and then the nut 20 is screwed up against the camera and tightened there to hold the camera in the desired position. The screw 21 being made long enough for the deepest holes and the nut 20 compensating for the differing depths of holes.

Figures 5, 6:
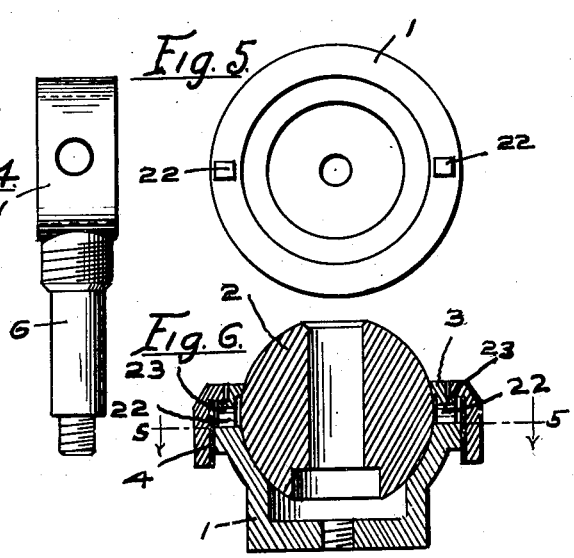
Figure 5 is a plan view of Figure 6 with certain parts omitted.
Figure 6 is a vertical section of the ball element and carrying parts to show a modified detail of structure.

Figures 5 and 6 show a modified construction of the means for clamping the ball member 2 onto the base member 1. The ring 3 of Figure 1 is free to turn with the clamp ring 4 or with the ball 2 under certain conditions of operation, or when a heavy camera is mounted on the tripod head which might have a tendency to loosen the screw ring 4 and thus loosen the ball 2 and let the camera swing from the desired position. This condition is obviated in the structure disclosed in Figs. 5 and 6. The base member 1 is provided with two or more integral lugs 22 which fit snugly into companion slots 23 in the lower edge of the clamp ring 3. The ring 3 is thus prevented from turning relative to the ball member 2 and would therefore make a somewhat securer clamping action.

The nut 8 on the lower end of the pan stem 6 is prevented from turning from an adjusted position by means of the small screw 24, Figure 1, by compressing the split portion of the nut 8 which binds the nut to the threads.

I claim:

1. A combined pan and tilt tripod head comprising a base member, means to secure said base member to a tripod, a ball member mounted in said base member, a clamping ring carried by said base member, a ring bearing against said ball member and actuated by said clamping ring member to clamp said ball member to said base member, an opening through said ball member, a rotatable stem mounted in said opening, a non-binding taper on the upper end of said stem and a companion taper on said ball member, a nut on the other end of said stem to bind said stem to said ball member for a stiff pan movement, the upper end of said stem carrying one element of a tilt bearing, a threaded portion on said stem between said ball member and said tilt bearing, a nut of said threaded portion to bind against said ball member to prohibit any rotation of said stem for pan movement, a tiltable element cooperating with the tilt element on said stem to form a tiltable joint, a pivot member passing through said tilt joint members and means for securing said pivot member in said joint, means for tightening said tiltable member to said pivot member, and means on said tiltable member for securing a camera thereto.

2. A combined pan and tilt tripod head comprising a base member, means for securing said base member to a tripod, a ball member mounted in said base member, a clamping ring carried by said base member, a ring bearing against said ball member and actuated by said clamping ring member to clamp said ball member to said base member, said ring bearing against said ball member having floating engagement with said clamping ring member to enable it to have freedom of lateral movement so as to center with said ball member, a stem carried by said ball member and rotatable relative thereto, means for binding said stem to said ball member for stiff pan action, other means on said stem for binding said stem to said ball member to prevent relative rotation, a portion of a tilt joint carried by said stem, a pivot pin secured to said joint portion, a tiltable element cooperating with said pivot pin to form a tiltable element, means for clamping said tiltable element to said pivot pin, means carried by said tiltable element to support a camera.

3. A combined pan and tilt tripod head comprising a base member, means for fastening said tripod head to a tripod, a ball member mounted in said base member, a clamping ring carried by said base member, a ring bearing element for contacting said ball member and actuated by said clamping ring to secure said ball member to said base member, said ring bearing element having floating engagement with said clamping ring member to enable it to have free lateral movement so as to center with said ball member, a rotatable tilting means carried by said ball member, a panning means forming a part of said tiltable member and engaged by said ball member, a means on said panning means for securing it to said ball member to prevent panning, a tiltable element carrying means for supporting a camera and with means for compensating for the depth of securing means on cameras to thereby fasten cameras securely to said tilting means.

4. A combined tilt and pan tripod head comprising a ball member having universal adjustment relative to a tripod, a base member secured to said tripod and supporting said ball member, said ball member having an opening carrying a panning element for panning movement therein, means on said panning element for securing it to said ball member to permit panning action and other means for locking it to said ball member to prevent panning action, a tilting element carried by said pan element, and means on said tilting element for securing a camera thereto.

5. A combined pan and tilt tripod head comprising a base member, a ball member seated on said base member, a clamping ring carried by said base member and a contact ring bearing on said ball member and having free lateral movement relative to said ball member, integral lugs on said base member, companion notches on the lower edge of said ring contact member engaging with said lugs to prevent movement relative to said ball member and said base member, a panning element carried by said ball member, means for securing said panning element to said ball member for panning action, other means for clamping said panning member to prevent panning to said ball member, tiltable means carried by said panning element and compensating means carried by said tiltable member for securing a camera to said tiltable member.

6. A combined pan and tilt tripod head comprising a base member, means to secure said base member to a tripod, a ball member mounted in said base member and means for securing said ball member against movement in said base member, said ball member having a central bore partly tapered and partly straight, a supporting part of a tiltable member having a stem partly tapered and partly straight to fit the bore of said ball member and means on said stem for frictionally engaging said ball member to permit a frictionally retarding relative movement therebetween, other means on said stem for locking said stem to said ball member to prevent relative movement, a tiltable element associated with said supporting part, a pivot means carried by said supporting part on which said tiltable element moves and means for locking said tiltable element to said pivot means and means on said tiltable element for supporting a camera.

CHARLES W. GRAHAM.

REFERENCES CITED

The following references are of record in the file of this patent:

UNITED STATES PATENTS

| Number | Name | Date |
| --- | --- | --- |
| 807,078 | Hoelzer | Dec. 12, 1905 |
| 1,831,086 | Zerk | Nov. 10, 1931 |